United States Patent [19]

Valenti

[11] 4,404,981
[45] Sep. 20, 1983

[54] SCUPPER DEVICE

[75] Inventor: James P. Valenti, Lancaster, Pa.

[73] Assignee: Armstrong World Industries, Inc., Lancaster, Pa.

[21] Appl. No.: 348,849

[22] Filed: Feb. 16, 1982

[51] Int. Cl.³ .............................................. F16K 13/04
[52] U.S. Cl. ..................................... 137/67; 137/360; 137/362
[58] Field of Search .......................... 137/67, 360, 362

[56] References Cited

U.S. PATENT DOCUMENTS

| | | | |
|---|---|---|---|
| 1,104,806 | 7/1914 | Kahn | 137/360 X |
| 3,209,732 | 10/1965 | Laken | 137/67 X |
| 3,787,650 | 1/1974 | Lewis | 137/67 X |
| 3,939,863 | 2/1976 | Robison | 137/360 X |

Primary Examiner—Harold W. Weakley

[57] ABSTRACT

Disclosed is a scupper or a drain device comprising an open-ended pipe adapted to be mounted through a wall at floor level and having a water-soluble substantially non-hygroscopic sealing film mounted and frictionally held in place adjacent the inlet opening of a pipe by a retaining ring.

5 Claims, 3 Drawing Figures

SCUPPER DEVICE

BACKGROUND OF THE INVENTION

1. Field of the Invention

This invention relates generally to water drains and, more particularly, to wall scupper devices used to drain water from the floors of buildings. Still more particularly, the invention relates to scupper devices which are designed to eliminate infiltration of air, dust, and dirt therethrough when they are not in use.

2. Description of the Prior Art

It has been relatively common practice in the past to provide buildings, especially multi-story buildings having automatically-operable sprinkler systems, with floor level drain pipes or scupper devices. These devices extend outwardly through walls and function to remove water from the floors of the buildings when it reaches a predetermined depth. This minimizes the water-damage potential to the building and its contents. The scupper devices further perform a very important function in eliminating water poured into such buildings to put out fires. In buildings where no scupper devices were used, it was frequently the case that water applied to the burning building to extinguish a fire caused more damage than the fire itself.

It is desirable that scupper devices used in buildings be provided with a closing means to eliminate the infiltration of cold air, dust, dirt, and the like when the devices are not functioning to drain water from the buildings. It is further desirable that the closing devices for the scupper pipes be accessible from the interior of the building and, ideally, that the closing means be automatically operable when water reaches a predetermined level on the floor or floors of a building.

DESCRIPTION OF THE PRIOR ART

Prior art scupper devices have generally been equipped with a closing means on the discharge end of the device and, since this is located on the outside of the building wall, the closing means of this type and at this location obviously has been relatively inaccessible especially when it is installed in multi-story buildings. In other prior art scupper devices having closing means which were accessible from the interior of the building and/or which are operated by the act of water on an element thereof, have heretofore been unsatisfactory in many respects, have been unduly complicated and expensive.

U. S. Pat. No. 2,792,009 relates to a wall-scupper device for use in buildings or other structures to drain water therefrom. The device of this patent employs a spring loaded trigger mechanism which mechanically drives a cap out of the outer end of the scupper to permit water to flow therethrough when a dissolvable element is contacted by water. In this case, the dissolvable element does not close or insulate the scupper, but instead merely actuates a trigger mechanism which operates the scupper closure. Obviously, the device of this patent is very complicated relatively expensive, and the closure for the pipe would be, in a multi-story building, relatively inaccessible.

U. S. Pat. No. 2,911,988 discloses the use of a water dissolvable element being employed to close off a liquid conduit. The soluble substance performs the double function of sealing the liquid passage and also mechanically controls the position of a spring operated valve. A very thin coating of a lacquer-like substance may be provided over the soluble material to withstand the action of most liquids for a sufficient length of time so that mists or vapors will not slowly dissipate the mechanical functions of the soluble material. However, the type lacquers used for this purpose will be perforated or dissipated by long continued presence of moisture and ultimately, an accumulation of liquid will gain access to the alum or other soluble substances.

U. S. Pat. No. 3,511,254 shows the use of a water-dissolvable element being employed to close off a liquid conduit. However, this element has a non-soluble coating and does not dissolve until the non-soluble coating is cracked. The element is used for support of high pressure water.

U. S. Pat. No. 3,338,499 discloses a seal comprising a circular disk fabricated from water-soluble synthetic plastic material and adapted to be used to block a conduit to retain an inert gas in the inner area of a pipe to provide a gas backing for a pipe joint to be welded. The plugs can be merely wads of water-soluble plastic, sheet material, or may have a corrugated or honeycomb structure with circular disks on both sides of the structure. The plugs are removed from the pipe by flushing with cold or room temperature water.

SUMMARY OF THE INVENTION

This invention relates to a scupper device comprising a pipe adapted to be installed through the wall of a building at the edge of a floor therein. The water-inlet opening is positioned to receive water from the floor. The water-discharge opening of the pipe on the outside of the wall is at a lower level than the water-inlet opening thereof. A water-soluble sealing film mounted on a retaining ring is positioned and frictionally held in place in the pipe adjacent the water-inlet opening thereof. The sealing film extends over one side the retaining ring and between the outer surface thereof and the inner surface of the pipe. This portion of the film being less accessible to water is substantially incompletely dissolved by its action and functions as a means for retaining the ring in position after the main body portion of the film is dissolved. The sealing film excludes air movement through the pipe when no water is present and dissolves upon contact with water thus allowing drainage of the water from the building floor.

It is an object of this invention to provide a scupper device including a single, substantially non-hydroscopic, water-soluble sealing film which is capable of dissolving within 15 to 30 seconds when contacted by water at 0 pounds pressure. It is a further object of the invention to provide such sealing film adjacent the water inlet opening in the pipe where it would be readily accessible from within the building. It is a still further object of the invention to provide the sealing film so positioned and held in place by a retaining ring.

A still further object is to provide such a sealing film which when so positioned and held in the pipe by the retaining ring includes a portion which extends between the outer surface of the ring and the inner surface of the pipe and incompletely dissolves when the main body portion of the film dissolves and functions to hold the ring in place in the pipe.

DESCRIPTION OF THE PREFERRED EMBODIMENT

Figure 1:
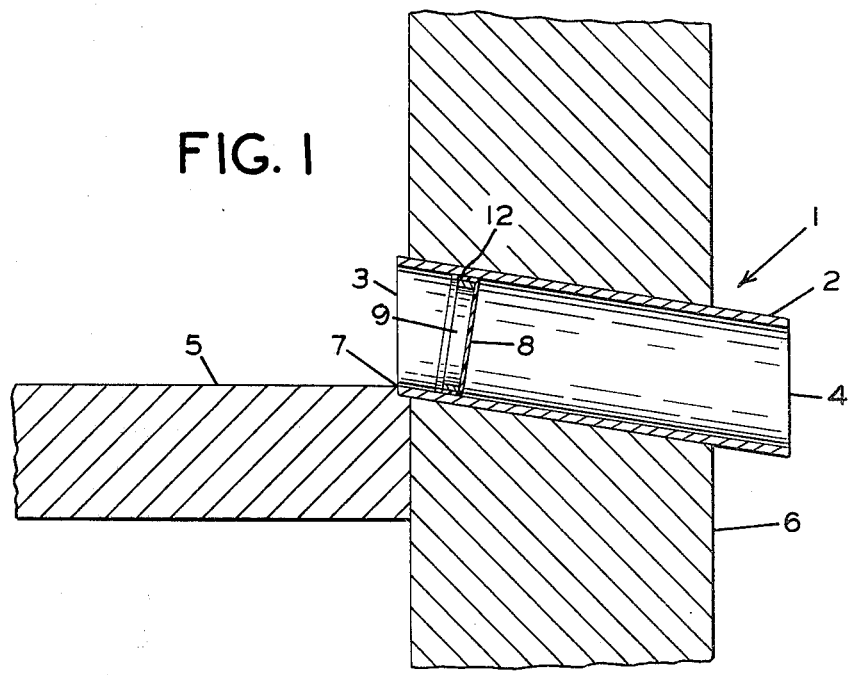
FIG. 1 is a diagrammatic cross-sectional view showing the scupper pipe mounted through a building wall at floor level with the water-soluble sealing film mounted in the pipe adjacent the inlet opening thereof on a retaining ring.

Referring to the drawings, the numeral 1 indicates generally the scupper device of this invention. The scupper device 1 comprises a tubular steel pipe 2 having an open water-inlet end 3 and an open water-discharge end 4. The scupper device 1 is mounted at a downwardly inclined angle with respect to the level of the floor 5 through the building wall 6. The bottom inner edge 7 of the pipe opening at the water inlet end 3 is positioned flush with the level of the floor 5 to facilitate entry of water from the floor into the pipe, thus minimizing the potential of water build-up on the floor prior to its drainage therefrom.

Figure 2:
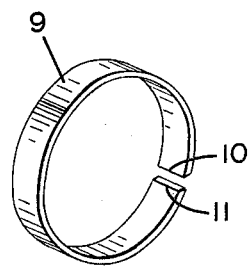
FIG. 2 is an isometric view showing the retaining ring.

A water-soluble member 8 is positioned in the pipe 2 adjacent the open water-inlet end 3 and frictionally held in place by retaining ring 9. As shown in FIG. 2 of the drawings, the retaining ring 9 is a split ring formed with edges 10 and 11 thereof in spaced-apart relation to each other. By so forming the ring 9, any slight adjustment which may be required to adapt the ring to slight variations which may exist in the size of the inner portion of the pipe may be easily made. The retaining ring is preferably made of plastic although other material such as steel tubing may be used if desired.

Figure 3:
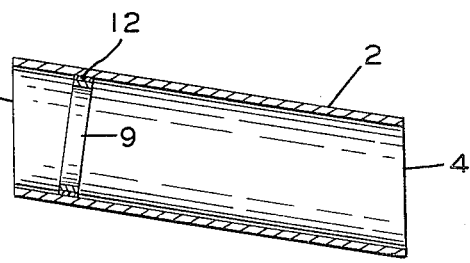
FIG. 3 is a cross-sectional view showing the retaining ring held in place in the pipe by the incompletely dissolved portion of the sealing film.

The water-soluble sealing film 8 which is held in place by the retaining ring 9 is preferably a poly (vinyl alcohol) material sold by Polymer Film (Woodside, N.J. under the trademark "Quick Sol A"). This film material is preferred because our tests show that it provided the best tear resistance for a friction seal, it is relatively non-hygroscopic, and has an average dissolving rate of 23 seconds when contacted with water at 0 head pressure. The non-hygroscopic feature of the film is critical because it is used as a medium to stop outside air infiltration which inevitably contains some moisture. Another advantage of the material is that when the film is held in place in the pipe by the retaining ring, at least a portion 12 of the film extends between the outer surface of the retaining ring and the inner surface of the pipe, and this portion being less accessible to water than the main body portion of the film substantially incompletely dissolves and functions as a means for retaining the ring in position as shown in FIG. 3, when the main body portion of the film 8 is dissolved.

The film and retaining ring are positioned in the pipe by merely placing the film over the side of the retaining ring which will face the discharge opening in the pipe when installed and forcing the ring and sealing film so mounted thereon into the pipe whereby at least a portion of the film will extend backwardly over the ring between the outer surface thereof and the inner surface of the pipe.

From the foregoing, it can be seen that by this invention, there is provided a wall scupper having positioned therein an easily installable and readily accessible sealing device including a water-soluble film which not only eliminates heat loss from the building and air infiltration thereinto, but which is substantially non-hygroscopic, is inexpensive, and which dissolves upon contact with cold or room temperature water at 0 pounds pressure in a time well within the requirements necessary to meet building codes and insurance company specifications.

What is claimed is:

1. In combination, a scupper device comprising a pipe having a water inlet opening at one end and a water discharge opening at the other end, said pipe being adapted to be installed through a building wall at the edge of a floor therein, with the inlet opening in a position to receive water from the floor, said discharge opening being positioned in a plane below that of the inlet opening, a retaining ring frictionally held in position in said pipe adjacent the water inlet opening therein, a single, water-soluble sealing film having a main body portion covering at least one side of said retaining ring to exclude air movement through the pipe when no water is present and, by dissolving when water is present, allow passage of water from the inlet opening through the pipe to the discharge opening thereof.

2. A scupper device according to claim 1, wherein the water-soluble film is mounted on the side of the retaining ring facing the discharge opening in the pipe, at least a portion of said film extending between the outer surface of the retaining ring and the inner surface of the pipe, said extending portion of said film being less accessible to water than said main body portion and being adapted to substantially incompletely dissolve and function as a means for retaining the ring in position when the main body portion is dissolved.

3. A scupper device according to claim 1, wherein the water-soluble sealing film is substantially non-hygroscopic.

4. A scupper device according to claim 3, wherein the water-soluble sealing film is a poly (vinyl alcohol) material.

5. A scupper device according to claim 1, wherein the water-soluble sealing film is dissolvable upon contact with non-pressurized water at room temperature within a time in the range from about 15 to 30 seconds.

* * * * *